No. 757,281. PATENTED APR. 12, 1904.
H. M. DE SACHET.
COOKING VESSEL.
APPLICATION FILED NOV. 2, 1903.
NO MODEL.
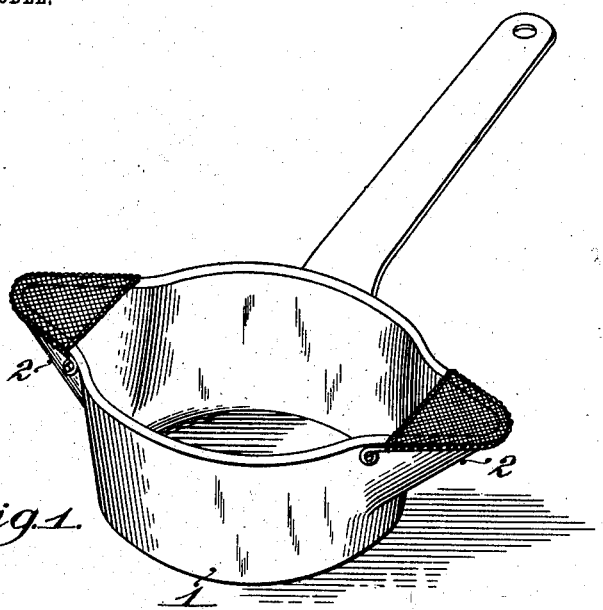
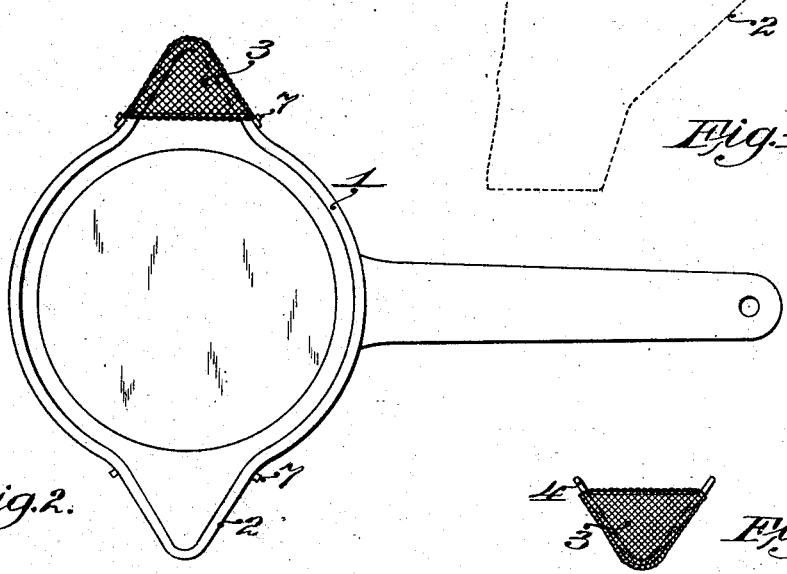
Witnesses
Edward S. Day
Farnum F. Dorsey
Inventor
Harriette M. De Sachet
by her Attorneys
Phillips Van Everen Fish No. 757,281. Patented April 12, 1904.

UNITED STATES PATENT OFFICE.

HARRIETTE M. DE SACHET, OF SOMERVILLE, MASSACHUSETTS.

COOKING VESSEL.

SPECIFICATION forming part of Letters Patent No. 757,281, dated April 12, 1904.

Application filed November 2, 1903. Serial No. 179,472. (No model.)

*To all whom it may concern:*

Be it known that I, HARRIETTE M. DE SACHET, a citizen of the United States, residing at Somerville, in the county of Middlesex and State of Massachusetts, have invented certain new and useful Improvements in Cooking Vessels; and I do hereby declare the following to be a full, clear, and exact description of the invention, such as will enable others skilled in the art to which it appertains to make and use the same.

The present invention relates to an improvement in cooking vessels.

The object of the present invention is to produce a cooking vessel embodying a strainer of improved construction and provided with means by which the strainer may be readily removed and securely fixed in place.

To this end the invention consists in the improved cooking vessel hereinafter shown and described.

In the drawings, Figure 1 is a perspective view of an improved cooking vessel having two strainers. Fig. 2 is a plan view of the same with one strainer removed. Fig. 3 is a plan view of a strainer; and Fig. 4 is a vertical section of the same, on a larger scale, indicating by dotted lines its position on the vessel.

The illustrated embodiment of the invention is constructed as follows: The body 1 of the vessel, which may be in the form of a stewpan or any other convenient form, is provided with one or more noses 2, through which its liquid contents may be poured out. The strainers comprise wire-gauze 3, secured to wire frames 4. The gauze is not secured flat to the frame 4, but is bent downward and inward at its forward edge. This permits the strainer to be applied, as clearly shown in Fig. 4, the bead 5 on the edge of the nose 2 being embraced by the wire-gauze. By this arrangement a close joint is secured between the gauze and the nose of the vessel, particularly as the gauze is flexible and will conform to slight irregularities in the bead. Since the bead overhangs the frame 4, the strainer can be removed from the vessel only by moving it horizontally sufficiently to disengage these parts, and to prevent accidental displacement of the strainer the ends of the frame 4 are provided with eyes 6, engaging projections 7 on the body of the vessel. The eyes and projections are held normally in engagement by the elasticity of the strainer and the vessel, but may be easily disengaged to remove the strainer by bending these parts slightly.

By the above-described arrangement the strainer may be securely fastened to the body of the vessel or easily removed therefrom in order to clean it.

The vessel of the illustrated embodiment of the invention is provided with two noses on opposite sides, so that it may be conveniently held in either hand while pouring from one nose and simultaneously stirring the contents of the vessel with the other hand. This feature, however, does not constitute part of the invention, but is shown merely as the best form known to me.

Having thus described my invention, I claim as new and desire to secure by Letters Patent of the United States—

A cooking vessel, having, in combination, a body provided with a nose, and a strainer removably secured to the nose comprising a piece of wire-gauze closing the nose and bent around and under the edge of the same and in close contact therewith, and an elastic wire frame secured to the outer edge of the strainer and having eyes formed in its ends, the body having coöperating pins for engaging the eyes and holding the strainer closely against the nose, substantially as described.

In testimony whereof I affix my signature in presence of two witnesses.

HARRIETTE M. DE SACHET.

Witnesses:
FRED P. BURNHAM,
VERE GOLDTHWAITE.